United States Patent
Muthukrishnan et al.

(10) Patent No.: US 7,782,951 B2
(45) Date of Patent: Aug. 24, 2010

(54) FAST MOTION-ESTIMATION SCHEME

(75) Inventors: Murali Babu Muthukrishnan, Karnataka (IN); Arvind Raman, Karnataka (IN); Bhavani Gopalakrishna Rao, Karnataka (IN); Manish Singhal, Karnataka (IN); Sankaranarayanan Parameswaran, Karnataka (IN); Sriram Sethuraman, Karnataka (IN); Dileep Kumar Tamia, Karnataka (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 1474 days.

(21) Appl. No.: 11/126,533

(22) Filed: May 11, 2005

(65) Prior Publication Data

US 2005/0265454 A1  Dec. 1, 2005

Related U.S. Application Data

(60) Provisional application No. 60/570,719, filed on May 13, 2004.

(51) Int. Cl.
*H04N 7/12* (2006.01)

(52) U.S. Cl. .......................... 375/240.16; 375/240.15; 375/240.01; 375/240.12

(58) Field of Classification Search ............ 375/240.15, 375/240.16
See application file for complete search history.

(56) References Cited

U.S. PATENT DOCUMENTS 7,072,398 B2 *  7/2006  Ma ........................ 375/240.16

\* cited by examiner

*Primary Examiner*—Andy S. Rao
*Assistant Examiner*—Geepy Pe
(74) *Attorney, Agent, or Firm*—Prakash Nama; Global IP Services, PLLC

(57) ABSTRACT

A motion estimation algorithm finds the best match for a given block or macroblock so that the resulting error signal has very low energy level which is computed, for e.g., by the SAD method. The motion estimation algorithm also provides for an optional sub-pixel level estimation and an inter4v search, and allows for restricting the number of searches for a Frame-frame ME (motion estimation) using Top-Top and Bottom-Bottom field MEs. The algorithm provides for a selective early exit and enables selecting a suitable search area with N candidate points (4 to 8) for starting the search. The search is conducted progressively till a minimum error signal (low energy level signal) is reached. The candidate points for search may be in a diamond shaped configuration, and there may be a plurality of successive diamond configurations, the number of which is configurable. The invention has application in MPEG-4 and H.264 standards.

17 Claims, 3 Drawing Sheets

FAST MOTION-ESTIMATION SCHEME

RELATED APPLICATIONS

Benefit is claimed under 35 U.S.C. 119(e) to U.S. Provisional Application Ser. No. 60/570,719, entitled "A fast full-pixel and sub-pixel motion estimation scheme" by Murali Babu Muthukrishnan et al, filed on May 13, 2004, which is herein incorporated in its entirety by reference for all purposes.

FIELD OF THE INVENTION

This invention relates generally to image compression, and more particularly to a fast motion estimation method in a predictive coding scheme.

BACKGROUND OF THE INVENTION

Block matching in motion estimation is a very significant and critical operation in the context of a temporal predictive coding scheme. As known, in the technique of block matching, a current frame is divided into square blocks of pixels, and an effort is made to find a new block (e.g., from a previous frame) that is close to a current block, according to a predetermined criterion. The new block is then used as a predictor for the current one, and the displacement between the two blocks is used to define motion vector associated with the current block. A full search (FS) for block matching needs a significant amount of resources, and some algorithms have been proposed to address the FS computational cost. While such algorithms for FS might make the search faster, there is some sacrifice in the visual quality. Moreover, such algorithms do not take into consideration the bits required to encode the motion vectors and therefore are not the preferred alternatives. It is desirable to have algorithms that consider the effect of the bit requirement of the motion vectors in the estimation process and yet not waste the resources required for a FS. It is known that there are several coding modes used, including InterV4, Inter, Intra, and Skip.

SAD (sum of absolute differences) is an algorithm used for digital motion estimation. The SAD method generates a metric of local uniqueness by calculating the distortion from a template image within a search window centred on the template image. In one form, performing SAD requires a number of subtractions with proper complementation to produce the absolute values which are followed by an accumulation to perform the final operation. In the context of this invention, resolution of a digital display for motion estimation is understood in terms of pixels. Also, the terms pixel and pel are used synonymously herein.

SUMMARY OF THE INVENTION

Taught herein is a method of motion estimation using a motion estimation algorithm and an article comprising a storage medium having instructions thereon for executing the method, for performing motion estimation. One embodiment of the invention resides in a method of motion estimation for predictive coding in a search window, comprising: selecting a predetermined number of N search points from motion vectors in said search window for a macroblock to be coded; evaluating the selected search points for error signal energy and cost function by using sum of absolute differences (SAD) of pixel values in said macroblock to be coded, to compute cost function of the selected search points; choosing a first search point location with a least cost function; progressively performing a local search around said first search point location at M number of points laid out in a known pattern and a known pixel spacing to evaluate error energy and cost function; and, exiting full pixel motion estimation when a new search point center location with a SAD cost function less than a cost function of other points in said M number of points is reached.

Another embodiment resides in a method of motion estimation for predictive coding in a search window, comprising the steps of: selecting N initial search points from known motion vectors in said search window for a macroblock to be coded; computing a cost function at each of said N search points and selecting a location with least cost; performing a local search around said selected location at M points arranged in a known configuration and a known spacing; evaluating if a cost function at a center of the M points is less than the cost function of remaining points from the M points; if affirmative, exiting full pixel motion estimation; and, if negative, progressively continuing local search around new low cost function points with progressively decreasing step sizes till a step size of "1" is reached. The cost function is evaluated using the SAD function, and, the known configuration and spacing are preferably a diamond configuration and one pixel spacing. The pixel spacing may be chosen based on spatial and temporal neighbors. In one embodiment, the method uses an additional step of sub-pixel estimation using direction strategy. In a modification, an added step of performing frame-frame motion estimation conditioned on two field-field motion estimation results. An optional added step is to use prior search information to switch refinement windows. Also taught herein are articles comprising a storage medium having instructions thereon which when executed by a computing platform result in execution of a method as recited above. Other variations and modifications are envisaged as described in the passages that follow.

Functionally, the estimation algorithm taught herein is designed to have a convergence to the best matching block in a fewer steps. The algorithm in one form estimates the best matching block in a two step strategy with the ability to exit the search early, thereby producing lower complexity search. The algorithm is also able to do a simplified inter4v and sub-pixel search. As described, the algorithm attempts to find a best match for a given block such as 8×8, or macroblock such as 16×16 in such a manner that the resulting error signal has very minimal energy. Also, in as much as the motion need not necessarily be in full pel units, the algorithm provides sub-pixel level estimation also, to find the best matching block or macroblock.

The following features are offered by the embodiments described herein:

1. Choice of predictor points (first stage) which enables early exit from the search.
2. Novel early exit based on fewer computations.
3. Use of prior search information to switch refinement windows.
4. Fast block motion vector estimation.
5. Fast sub-pixel motion estimation using direction strategy.
6. Simplifying the number of searches for interlaced motion estimation by performing frame-frame motion estimation conditioned on two field-field motion estimation results. Other features will be apparent from the description that follows.

BRIEF DESCRIPTION OF THE DRAWING

Embodiments of the invention will now be described by way of example only, with reference to the accompanying drawings, wherein.

DETAILED DESCRIPTION

Figure 1A:
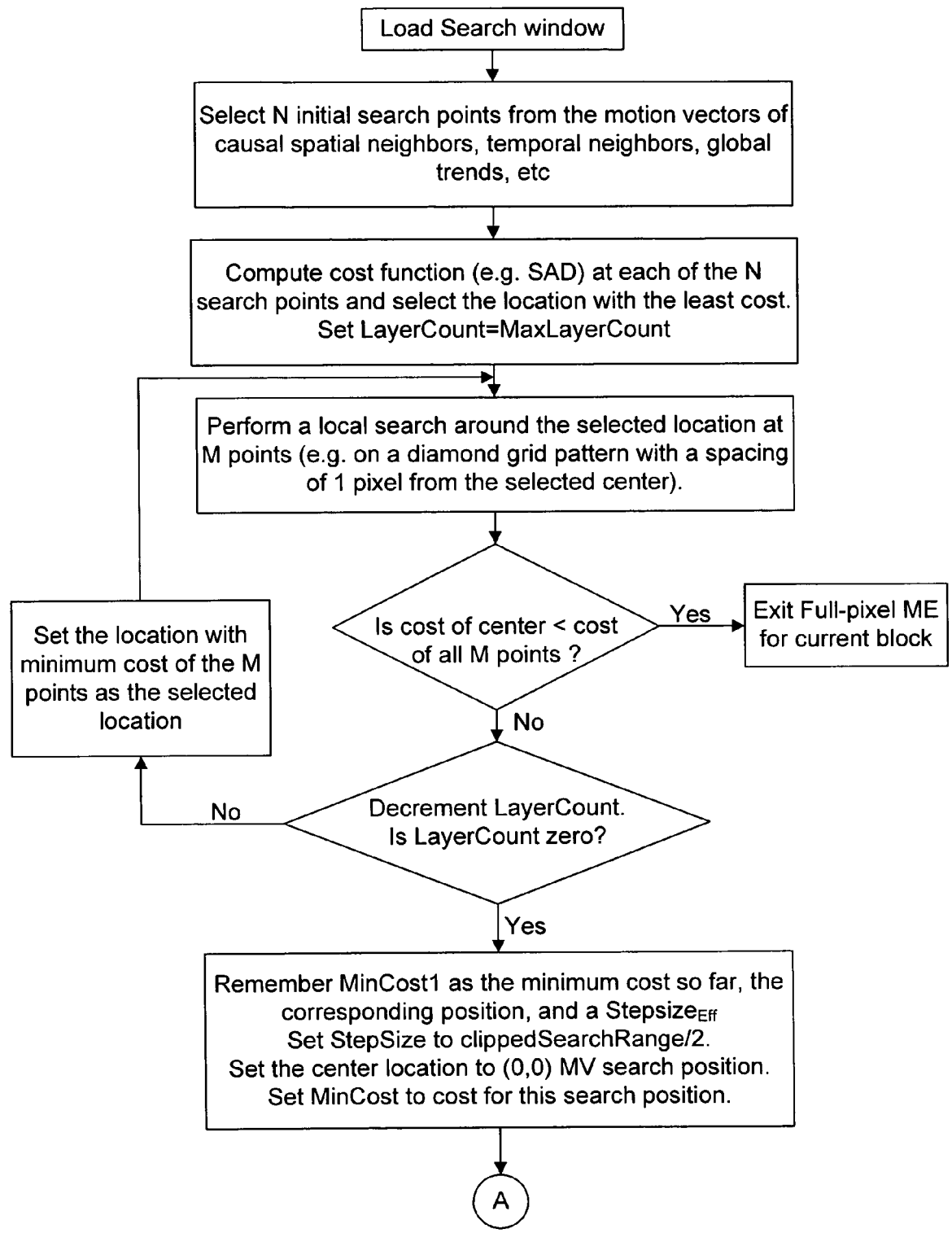
FIGS. 1A and 1B illustrate an exemplary flow chart that can be used in practising the invention; and, FIG. 2 illustrates a general purpose computing platform that can be used in implementing the invention.

In the following detailed description of the embodiments of the invention, reference is made to the accompanying drawings that form a part hereof, and in which are shown by way of illustration of specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims.

Described hereinafter is a motion estimation algorithm that teaches a search method which estimates the best matching block in a two-step strategy with the ability to exit the search early and thereby save computational cost and time. Motion estimation is known as the key block in the temporal predictive coding scheme. The motion estimation algorithm taught herein, in addition to providing convergence to the best matching block in fewer steps, is also capable of doing a simplified inter-4v and sub-pixel search. In one example, the algorithm can also minimize the search based on the computation of block-matching at 5 predictor points and thereby makes use of the statistical property of the motion vectors.

In one form, the motion estimation algorithm taught herein is carried out in several stages. The overall aim of the estimation algorithm is to find a best match for a given block (8×8) or macroblock (16×16) such that the resulting error signal has very low energy. Also, since the motion need not be in full pel units, a sub-pixel level estimation is also required to find the best matching block or macroblock. In one form of the algorithm, a top-down approach is used in a flow chart, where macroblock matching is searched for, followed by block level matching and finally sub-pixel matching. An early exit from this search is also implemented based on the criteria described later in the flow chart. Given the large frame sizes and all possible motion directions for a block, it is desirable to first restrict the search to a limited area. The algorithm has a provision to set the search area to any of 16×16, 32×32, 64×64 and 128×128. Based on the expected motion level for a sequence an appropriate search area can be chosen by the user. The algorithm is configurable to support these search areas. Given this search area, it will be very time-consuming to search for every point in this search area. For example, for a 32×32 (commonly used) search area, the number of search points is 1024. This can be very prohibitive on an embedded implementation. Therefore a few points within this area are selected based on the criteria explained below.

Fast Fall-Pel Search Strategy:

Analysis by the inventors indicates that the initial point where the search is to be centered is very critical for converging towards a minimum error signal, considering the fact that not all points within the search are used for estimating the motion. Based on inventors' analysis of the given standards and based on experiments, a total of N candidate search points are selected, where N can be 4 to 8, which will be evaluated for the error signal energy. The N predictor points are the median motion vector of the adjacent already codec macroblocks and the top, top left, left and top right macroblock motion vectors, and global motion vector computed from the previous frame MBs and 0-Motion vector and the motion vector of the temporally co-located macroblock. The median vector is used because the standard uses this for prediction and therefore if this point is likely to be the minimum error signal then the motion vector coding bits will also be minimal. The other adjacent pixels are chosen based on the spatial and temporal neighbors. The error signal is evaluated at all these N points and the one having minimum error signal energy is chosen for the next set of search. The error signal energy is computed for example, using the sum of absolute differences (SAD) of the pixel values in the macroblock to be coded and the 16×16 point located at the specified position in the reference frame. It is discovered that it is most likely that the error signal energy is very minimal around these predictor points. Therefore the algorithm picks the predictor point with the least error energy and uses a diamond search of 4-points around this point, to evaluate if the error-signal graph changes to produce new minima. If a new minima is found, a next level of diamond search is centered on this point. The number of such diamond search levels allowed is configurable. If at any stage the minimum stays at the centre of the diamond search then that point is declared to be the motion vector and further search is not carried out. If otherwise, the error signal energy (or the cost function) called MinCostfunction1 that was found to be the minimum in the earlier step is stored along with the corresponding StepSize (StepSize$_{Eff}$) that would allow eight points that are spaced by StepSize$_{Eff}$ in x or y directions or both from this position, given the search range. The motion estimation algorithm does a next level of search. In the next level of search, the search is centered at the center of the search window and a search is performed with logarithmic steps, i.e., from the center point at a distance of StepSize/2 (where StepSize is initialized to SearchRange/2). Eight points are chosen and the error signal is computed at all these eight points. The minimum among these eight points is chosen and the search is now centered on this new minimum point with a step size of search range/4 and the search continued progressively until the StepSize is 1. Each stage is checked to see if the computed minimum error signal energy of the 9 points is less than the MinCostfunction1. If the MinCostfunction1 is less and also if the current StepSize is less than or equal to the StepSize$_{Eff}$ computed above, then the centre of the window is switched to the point where the MinCostfunction1 was encountered. Inventors' analysis and experiments indicate that this type of search converges towards the minimum error signal.

Fast Sub-Pel Refinement Strategy:

Around the determined motion vector point, a half-pixel refinement search is carried out. Typically, the half-pixel refinement uses all the eight half-pel points around the current best full-pel search location to determine which of these 9 points (including the centre point) have a lower cost function. Instead of computing the eight sub-pel cost functions which first involves getting the interpolated values corresponding to each of these sub-pixel positions in the reference macroblock and then computing the cost function against the current macroblock, the proposed method eliminates a configurable number of unlikely candidates using the Full-pel costs at the 4 points which make a diamond search around the center. When performing the full-pel motion as described earlier, these values will be there most of the times (every time an early exit is taken and every time the step-1 search has a minimum at its center). The process of how the cost at the sub-pel points is estimated from these full-pel costs is shown in figures below.

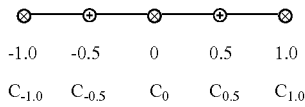

In the figure above, the positions marked with a cross indicate the full-pel positions and the half-pel positions are indicated by a plus sign. Assuming that it is desired to estimate the sub-pixel costs at locations −0.5 and +0.5 (0.5 being the distance from the centre point), the sub-pel costs are estimated by using a quadratic function $$S_1X^2+S_2X+S_3,$$

where $S_1$ is $=(C_{-1.0}+C_{1.0})/2-C_0$, $S_2=(C_{1.0}-C_{-1.0})/2$ and $S_3=C_0$.

Using these full-pel cost values and substituting x=−0.5 or +0.5 in the equation shown above, provides an estimation of the sub-pel costs $C_{-0.5}$ and $C_{0.5}$.

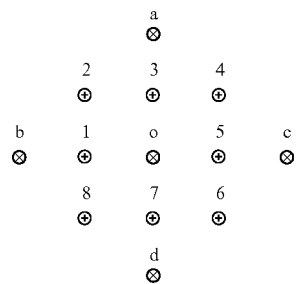

Sub-pel costs at positions 1, 3, 5 and 7 are computed using the above mentioned quadratic fit. For example, to estimate cost at positions or points 3 and 7, the full pel costs at a, o and d are used as per the above equation. The other sub-pel costs at positions 2, 4, 6 and 8 are interpolated using linear interpolation. For example, SAD at position 4 is estimated from full-pel cost of a and C $((C_a+C_c+1)>>1)$.

The estimated cost function values at positions 1, 3, 5 and 7 are computed and sorted. A configurable number of positions $N_{L1}$ (varying from 0 to 3) is chosen from this sorted list for actual refinement. Similarly, the minimum cost function values of positions 2, 4, 6 and 8 are computed and sorted. A configurable number of positions $N_{L2}$ (varying from 0 to 3) are chosen from this sorted list for actual refinement. After actual sub-pixel refinement with the chosen positions, the position with the minimum cost function is chosen as the best sub-pixel motion estimate.

The motion vectors can be computed either at a macroblock level or at a sub-macroblock level. Standards such as MPEG-4 and H.264 allow multiple motion vectors to be sent per macroblock. It is noted that MPEG-4 allows each 8×8 block under a macroblock to have a different motion vector (called Inter-4V mode). H.264 allows 7 different block sizes on which motion information can be sent. Multiple methods exist for refining the motion on sub-blocks that can leverage the full-pixel motion estimation for the entire macroblock. However, the cost of sending multiple motion vectors poses a significant overhead since the percentage of macroblocks with sub-block level motion vectors is quite small in a rate-distortion optimal sense. Here, a mechanism is proposed that can be used to skip the sub-block refinement when the scope for improvement using the refinement is quite small. By assuming that the same motion vector is sent multiple times for each sub-block, a motion vector coding cost is estimated. Using a model that links the bits to input distortion to the encoder (for instance, bits=X*Sad/Qp), the excess bits for the sub-block MVs over the 16×16 MV can be converted into an equivalent input distortion reduction that needs to happen with the sub-block MV mode ($C_{subblk-red}$). At the operating quantizer for the macroblock, the input distortion at which no residual coefficients need to be coded ($C_{notCoded}$) is determined empirically for the encoder. The difference between the input distortion with the 16×16 MV mode ($C_{16×16}$) and $C_{notCoded}$ gives an indication of the scope available for input distortion reduction that can result in bit savings. This difference ($C_{16×16}-C_{notCoded}$) is compared against the minimum input distortion reduction $C_{subblk-red}$ needed to offset the MVbits cost. Only if the difference is greater than $C_{subblk-red}$, sub-block motion vector refinement process is undertaken.

The same algorithm for full-pixel motion estimation is extended to interlaced picture motion estimation as follows. The top field of the current macroblock is searched for minimum error signal energy position in the reference picture's top field. Similarly the bottom field minimum error signal energy position is also computed using the bottom reference field. Out of the five possible motion estimation combinations (Top field—Top field, Bottom field—Bottom field, Top field—Bottom field, Bottom field—Top field, and Frame—Frame), the above covers only 2. The Frame-Frame motion estimation is performed only if the Top-Top, Bottom-Bottom motion vectors are within a certain distance in pixels (typically, 2 pixels). Each of these motion vectors is chosen as an initial candidate and a refinement region is chosen around the position that gives the minimal cost for the Frame-Frame case and an N-step search is performed within this region. This provides quick convergence for the Frame-Frame case. For the cross-field case, only the field that is closer to both the fields of the current picture is chosen. The top-top and bottom-bottom motion vectors are suitably scaled according to the distances (for instance, the motion vector for top-top is divided by 2 to get a candidate for top-bottom in the case of top-field first). The two candidates thus obtained by scaling are used as initial candidates and a small refinement region is chosen around the better of these two. An N-step search is performed within this refinement region. Typically, in the above two cases, a small refinement region of 3×3 is found to be sufficient. Thus, the complexity of the interlaced motion estimation has been-reduced to the level of just being incremental over the two-field estimation complexity.

The exemplary motion estimation algorithm taught herein offers the following features:

1. Combination of initial search with configurable local search, together with N-step search, wherein the N-step search is performed only if early-exit is not reached with step 2.
    a. Diamond search being the local search method.
    b. Spatial predictors as initial candidates.
    c. Temporal predictors as initial candidates.
    d. Predictors from field and frame MC macroblocks.

2. Window switching from N-step center to best diamond search point at a suitable step size in the N-step search process.
3. Fast sub-pixel motion estimation from the error metrics of full-pixel motion estimation.
   a. Configurable number of search points for actual sub-pel refinement
   b. No overhead to get the full pixel error metrics when performed in conjunction with step 1.
4. Restricting the number of searches for a Frame-Frame ME using Top-Top and Bottom-Bottom field ME values.
5. Doing only the temporally closest cross field search.
6. Restricting sub-block searches based on a metric for the scope for further reduction in distortion after accounting for the increase in MV cost.

Figure 1B:
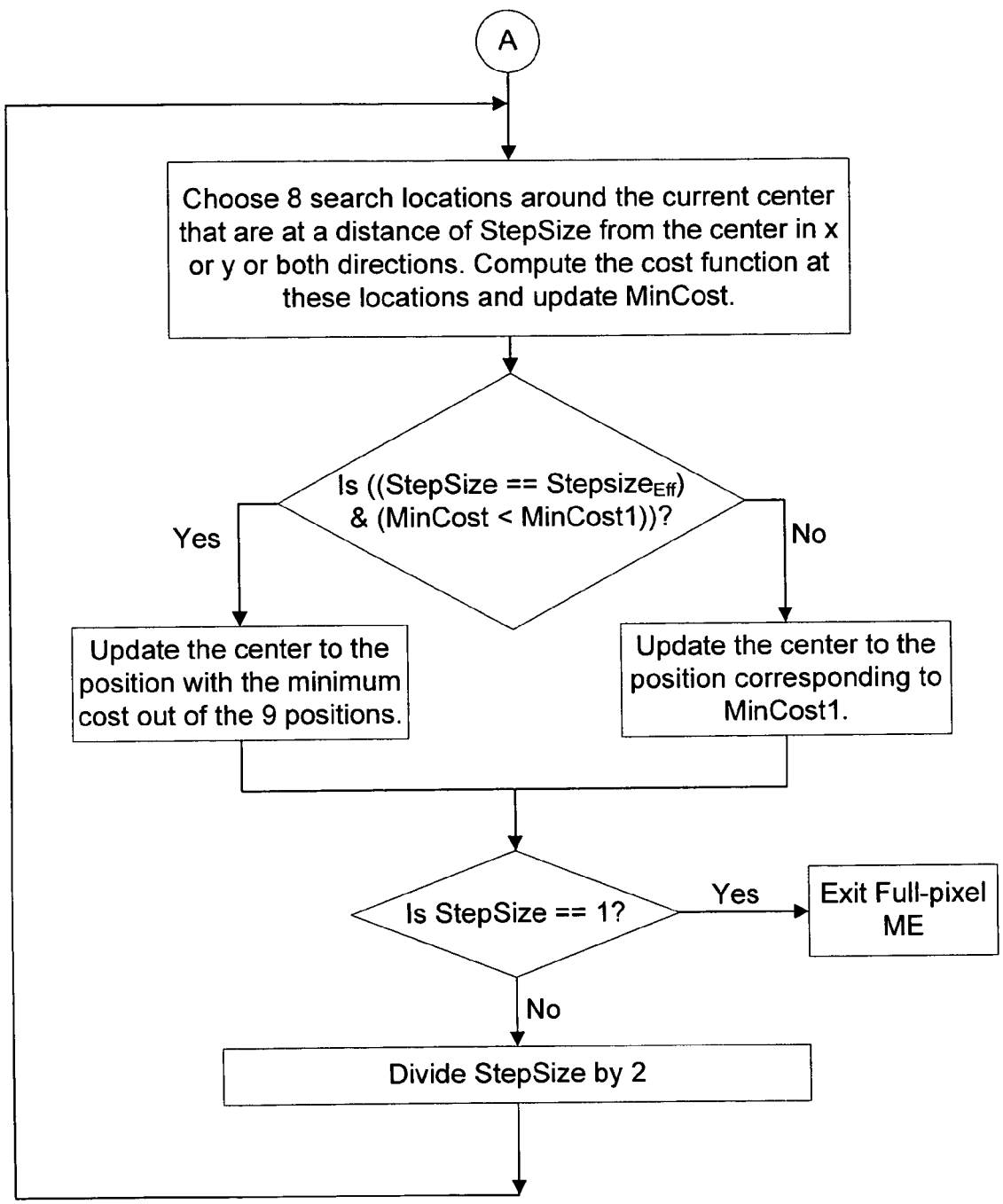

An exemplary flow chart of the present motion estimation algorithm is illustrated in FIGS. 1A and 1B. The steps in the algorithm for the flow chart are as under: 1. Load the search window. 2. Select N initial search points from the motion vectors from sources including causal spatial neighbors, temporal neighbors, and global trends. 3. Compute cost function (e.g. SAD) at each of the N search points and select the location with the least cost. Set Layer Count=MaxLayerCount. 4. Perform a local search around the selected location at M points (e.g. on a diamond grid pattern with a spacing of 1 pixel from the selected center). 5. Is cost of center <cost of all M points? If step 5 is affirmative, exit full-pixel ME for current block. If step 5 is negative, go to step 6. 6. Decrement Layer Count. Is Layer Count Zero? If not, set the location with minimum cost of the M points as the selected location, and loop back to step 4. If affirmative, go to step 7. 7. Remember MinCost 1 as the minimum cost so far, the corresponding position, and a StepSize$_{Eff}$. Set StepSize to clippedSearchRange/2. Set the center location to (0, 0) MV search position. Set MinCost to cost for this search position. 8. Choose 8 search locations around the current center that are at a distance of StepSize from the center in x or y or both directions. Compute the cost function at these locations and update MinCost. 9. Is (StepSize==StepSize$_{Eff}$) & (MinCost<MinCost1)). 10. If step 9 is affirmative, update the center to the position with the minimum cost, out of the 9 positions. If step 9 is negative, update the center to the position corresponding to MinCost 1. 11. Is StepSize==1? If affirmative, exit full-pel ME. If negative, go to step 12. 12. Divide StepSize by 2, and loop back to step 8.

The foregoing is a description of preferred embodiments of the present motion estimation algorithm to find the best match for a given block or macroblock so that the resulting error signal has very low energy level. The energy level may be evaluated using the SAD method or any other alternative method. The motion estimation algorithm also provides for an inter4v search. The algorithm allows for restricting the number of searches for a Frame-frame ME (motion estimation) using Top-Top and Bottom-Bottom field MEs. Since the motion need not be in full units, the present algorithm provides also for an optional sub-pixel level estimation. The algorithm provides for a selective early exit and enables selecting a suitable search area with N candidate points for starting the search. The N candidate points are selected for SAD evaluation, where N can be 4 to 8. The search is conducted progressively till a minimum error signal (low energy level signal) is reached. The candidate points for search may be in a diamond shaped configuration, and there may be a plurality of successive diamond configurations, the number of which is configurable. Modifications of the present algorithm using the invention are conceivable, and are within the ambit of the invention.

Figure 2:
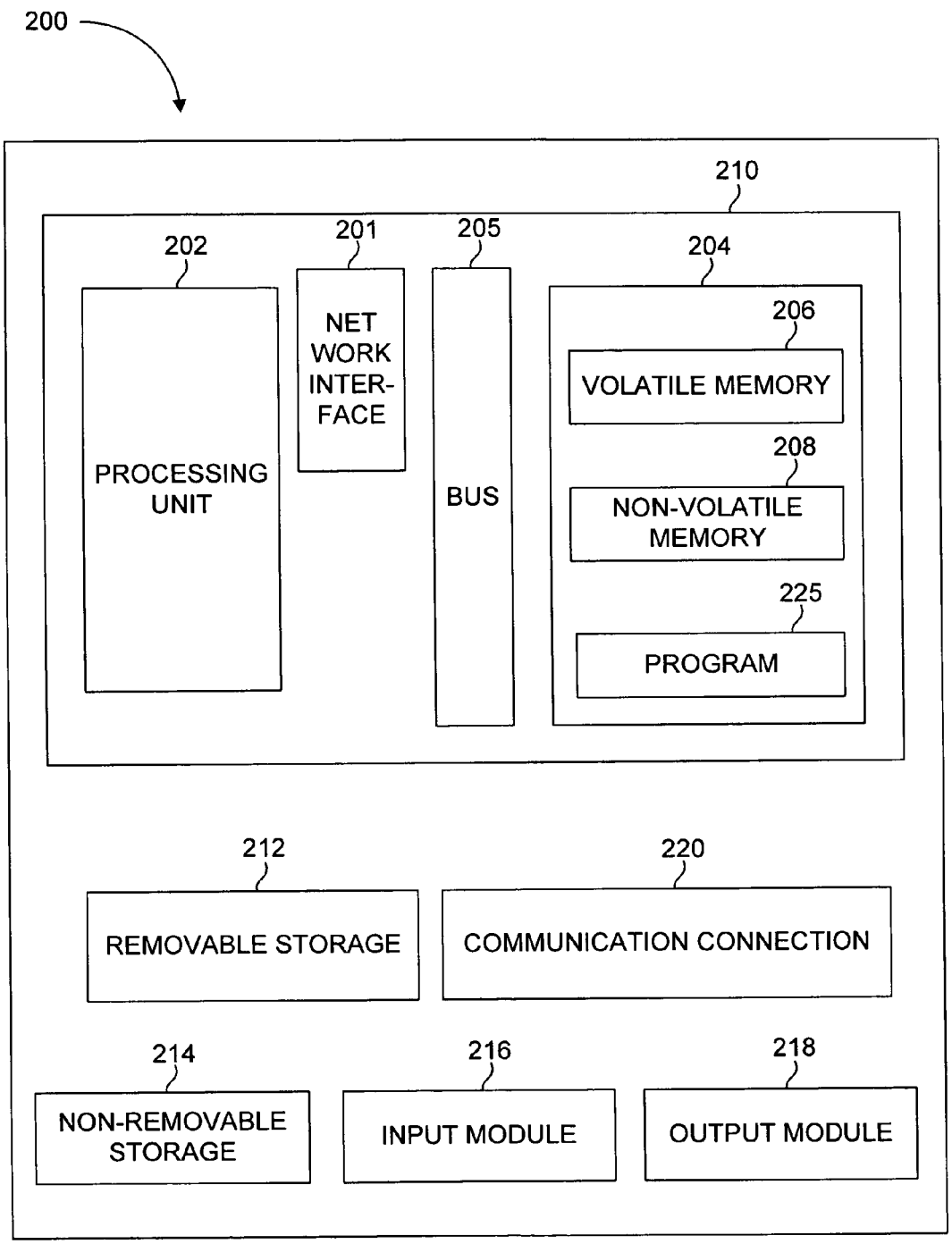

Various embodiments of the present subject matter can be implemented in software, which may be run in the environment shown in FIG. 2 or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. It is also noted that the embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

FIG. 2 shows an example of a suitable computing system environment 200 for implementing embodiments of the present subject matter. FIG. 2 and the following discussion are intended to provide a brief, general description of a suitable computing environment in which certain embodiments of the inventive concepts contained herein may be implemented.

A general computing device in the form of a computer 210 may include a processing unit 202, memory 204, removable storage 212, and non-removable storage 214. Computer 210 additionally includes a bus 205 and a network interface (NI) 201. Computer 210 may include or have access to a computing environment that includes one or more user input devices 216, one or more output modules or devices 218, and one or more communication connections 220 such as a network interface card or a USB connection. The one or more user input devices 216 can be a touch screen and a stylus and the like. The one or more output devices 218 can be a display device of computer, computer monitor, TV screen, plasma display, LCD display, display on a touch screen, display on an electronic tablet, and the like. The computer 210 may operate in a networked environment using the communication connection 220 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 204 may include volatile memory 206 and non-volatile memory 208. A variety of computer-readable media may be stored in and accessed from the memory elements of computer 210, such as volatile memory 206 and non-volatile memory 208, removable storage 212 and non-removable storage 214. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the abovementioned storage media are executable by the processing unit 202 of the computer 210. For example, a computer program 225 may include machine-readable instructions capable of executing the method of reduced computation-intensive motion estimation search taught hereinabove. In one embodiment, the computer program 225 may be included on a CD-ROM and loaded from the CD-ROM to a hard drive in nonvolatile memory 208. The machine-readable instructions cause the computer 210 to encode according to the various embodiments of the present subject matter.

The foregoing is the description of exemplary implementations of an exemplary motion estimation algorithm using SAD, which not only requires fewer matching steps but also provides simplified inter-4v and sub-pixel search. The description hereinabove is intended to be illustrative, and not restrictive.

The various choices and search parameters used in the motion estimation algorithm described hereinabove are only by way of example, and in no way intended to limit the applicability of the invention. In addition, the techniques of the various exemplary embodiments are useful to the design of any hardware implementations of software, firmware, and algorithms in the context of motion estimation in general.

Many other embodiments will be apparent to those skilled in the art. The scope of this invention should therefore be determined by the appended claims as supported by the text, along with the full scope of equivalents to which such claims are entitled.

The invention claimed is:

1. A method of full pixel motion search for temporal predictive coding in a search window having a search center within a range of the search window, comprising:
  performing a configurable number of pattern searches around and starting with the search center, wherein search center of each of the configurable number of pattern searches is progressively updated with a first location with least error signal energy among at least M locations around the search center;
  when error signal energy of one of at least M number of locations around the search center is less than that of the search center after the configurable number of pattern searches,
    identifying a second location with least error signal energy among the at least M number of locations around the search center; and
    computing effective step-size$_X$ and effective step-size$_Y$ as a respective function of distances of the second location from horizontal axis and vertical axis within the range;
  performing a 9-point logarithmic step-size search around a center of the search window, wherein 8 search locations are located in each direction around the center of the search window with a step-size, and wherein the step-size is a function of the range;
  when error signal energy of one of the 8 search locations is less than that of the center of the search window, identifying a location with least error signal energy among the 8 search locations and setting the identified location as a center location;
  when error signal energy of one of the 8 search locations is greater than or equal to that of the center of the search window, setting the center of the search location as a center location;
  setting a new step-size to half the step-size in each direction around the new center location;
  determining whether the new step-size in the horizontal direction is less than or equal to effective step-size$_X$, new the step-size in the vertical direction is less than or equal to effective step-size$_Y$, and error signal energy of the second location is less than that of the center location;
    setting a new search center as the second location when the new step-size in the horizontal direction is less than or equal to effective step-size$_X$, the new step-size in the vertical direction is less than or equal to effective step-size$_Y$, and error signal energy of the second location is less than that of the new center location; and
    setting the new center location as a new search center when otherwise; and
  repeating performing 9-point logarithmic step-size search around the new search center with the step size, setting the new center location, setting the new step size, determining, and setting the new search center until the step size of 1 is reached to identify full pixel motion.

2. A method of full pixel motion search for temporal predictive coding in a search window having a search center within a range of the search window, comprising:
  performing a configurable number of pattern searches around and starting with the search center, wherein search center of each of the configurable number of pattern searches is progressively updated with a first location with least error signal energy among at least M locations around the search center, and wherein performing the configurable number of pattern searches around a center location with least error signal energy among the at least M number of locations comprises:
    performing a pattern search, in a known pattern at a known pixel spacing, around the first location;
    determining whether error signal energy of the first location is less than that of each of at least M number of locations around the first location;
      when the error signal energy of the first location is less than that of each of at least M number of locations, exiting full pixel motion search with the first location as full pixel motion for temporal predictive coding; and
      when the error signal energy of the first location is greater than or equal to that of each of at least M number of locations, identify a location with least error signal energy among the at least M number of locations around the first location;
    updating the identified location as a new center location; and,
    repeating the steps of performing the pattern search around the new center location and determining for the configurable number of pattern searches;

when error signal energy of one of at least M number of locations around the search center is less than that of the search center after the configurable number of pattern searches,
  identifying a second location with least error signal energy among the at least M number of locations around the search center; and
  computing effective step-size$_X$ as a respective function of distances of the second location from horizontal axis and vertical axis within the range;
performing a 9-point logarithmic step-size search around a center of the search window, wherein 8 search locations are located in each direction around the center of the search window, with a step-size, and wherein the step-size is a function of the range;
when error signal energy of one of the 8 search locations is less than that of the center of the search window, identifying a location with least error signal energy among the 8 search locations and setting the identified location as a new center location;
when error signal energy of one of the 8 search locations is greater than or equal to that of the center of the search window, setting the center of the search location as a new center location;
setting a new step-size to half the step-size in each direction around the new center location;
determining whether the new step-size in the horizontal direction is less than or equal to effective step-size$_X$, the new step-size in the vertical direction is less than or equal to effective step-size$_Y$, and error signal energy of the second location is less than that of the new center location;
  setting a new search center as the second location when the new step-size in the horizontal direction is less than or equal to effective step-size$_X$, the new step-size in the vertical direction is less than or equal to effective step-size$_Y$, and error signal energy of the second location is less than that of the new center location; and
  setting the new center location as a new search center when otherwise; and
repeating performing 9-point logarithmic step-size search around the new search center with the new step size, setting the new center location, setting the new step size, determining, and setting the new search center until the new step size of 1 is reached to identify full pixel motion.

3. The search method as in claim 2, wherein said known pixel spacing is one pixel spacing, and wherein said known pattern comprises a diamond grid pattern.

4. The search method of claim 2, wherein the step of performing the 9-point logarithmic step-size search around the center location of the search window is performed when the full pixel motion is not identified in the configurable number of pattern searches.

5. The search method as in claim 1, further comprising:
selecting a predetermined number of N search locations within the search window;
choosing a location with least error signal energy among the predetermined number of N search locations; and
setting the location as the search position for performing the configurable number of pattern searches.

6. The search method as in claim 5, wherein said predetermined number of N search points is chosen based on spatial and temporal neighbors to a block for which the motion estimation is being performed, the method including the step of conducting a block inter-4v search followed by sub-pixel motion estimation using direction strategy.

7. A method of full pixel motion search for temporal predictive coding in a search window having a search center within a range of the search window, comprising:
selecting a predetermined number of N search locations within the search window, wherein said N search locations are predictor points which selectively relate to median motion vectors of adjacent already coded macroblocks and also top, top-left, and top-right macroblock motion vectors and global motion vectors computed from previous frame motion vectors and 0-motion vector, and a motion vector of a temporally co-located macroblock;
choosing a location with least error signal energy among the predetermined number of N search locations;
setting the location as the search position for performing a configurable number of pattern searches;
performing the configurable number of pattern searches around and starting with the search center, wherein search center of each of the configurable number of pattern searches is progressively updated with a first location with least error signal energy among at least M locations around the search center;
when error signal energy of one of at least M number of locations around the search center is less than that of the search center after the configurable number of pattern searches,
  identifying a second location with least error signal energy among the at least M number of locations around the search center; and
  computing effective step-size$_X$ and effective step-size$_Y$ as a respective function of distances of the second location from horizontal axis and vertical axis within the range;
performing a 9-point logarithmic step-size search around a center of the search window, wherein 8 search locations are located in each direction around the center of the search window with a step-size, and wherein the step-size is a function of the range;
when error signal energy of one of the 8 search locations is less than that of the center of the search window, identifying a location with least error signal energy among the 8 search locations and setting the identified location as a new center location;
when error signal energy of one of the 8 search locations is greater than or equal to that of the center of the search window, setting the center of the search location as a new center location;
setting a new step-size to half the step-size in each direction around the new center location;
determining whether the new step-size in the horizontal direction is less than or equal to effective step-size$_X$, the new step-size in the vertical direction is less than or equal to effective step-size$_Y$, and error signal energy of the second location is less than that of the new center location;
  setting a new search center as the second location when the new step-size in the horizontal direction is less than or equal to effective step-size$_X$, the new step-size in the vertical direction is less than or equal to effective step-size$_Y$, and error signal energy of the second location is less than that of the new center location; and
  setting the new center location as a new search center when otherwise; and
repeating performing 9-point logarithmic step-size search around the new search center with the new step size, setting the new center location, setting the new step size, determining, and setting the new search center until the new step size of 1 is reached to identify full pixel motion.

8. The search method as in claim 1, further comprising:
storing the search center at the step size of 1; and
performing sub-pixel motion search from the full-pixel motion search.

9. The search method as in claim 8, further comprising
performing sub-pixel motion search in each direction around the new search center using a quadratic equation; and
performing sub-pixel motion search in cross directions around the new search center using linear interpolation method.

10. A method of full pixel motion search for temporal predictive coding in a search window having a search center within a range of the search window, comprising:
performing a configurable number of pattern searches around and starting with the search center, wherein search center of each of the configurable number of pattern searches is progressively updated with a first location with least error signal energy among at least M locations around the search center;
when error signal energy of one of at least M number of locations around the search center is less than that of the search center after the configurable number of pattern searches,
identifying a second location with least error signal energy among the at least M number of locations around the search center; and
computing effective step-size$_X$ and effective step-size$_Y$ as a respective function of distances of the second location from horizontal axis and vertical axis within the range;
performing a 9-point logarithmic step-size search around a center of the search window, wherein 8 search locations are located in each direction around the center of the search window with a step-size, and wherein the step-size is a function of the range;
when error signal energy of one of the 8 search locations is less than that of the center of the search window, identifying a location with least error signal energy among the 8 search locations and setting the identified location as a center location;
when error signal energy of one of the 8 search locations is greater than or equal to that of the center of the search window, setting the center of the search location as a new center location:
setting a new step-size to half the step-size in each direction around the new center location;
determining whether the new step-size in the horizontal direction is less than or equal to effective step-size$_X$, the new step-size in the vertical direction is less than or equal to effective step-size$_Y$, and error signal energy of the second location is less than that of the new center location;
setting a new search center as the second location when the new step-size in the horizontal direction is less than or equal to effective step-size$_X$, the new step-size in the vertical direction is less than or equal to effective step-size$_Y$, and error signal energy of the second location is less than that of the new center location; and
setting the new center location as a new search center when otherwise;
repeating performing 9-point logarithmic step-size search around the new search center with the new step size, setting the center location, setting the new step size, determining, and setting the new search center until the step size of 1 is reached to identify full pixel motion;
storing the search center at the step size of 1;
performing sub-pixel motion search from the full-pixel motion search;
performing sub-pixel motion search in each direction around the new search center using a quadratic equation, wherein the quadratic equation comprises:

$S_1X^2+S_2X+S_3$, wherein X is −0.5 or +0.5 depending on the sub-pixel to the left or right or to the top or bottom of the search center, $S_1=(C_{-1.0}+C_{1.0})/2-C_0$, $S_2=(C_{1.0}-C_{-1.0})/2$ and $S_3=C_0$, $C_0$ is error signal energy computed at the new center location obtained in the full pixel motion search and $C_{-1.0}$ and $C_{1.0}$ are error signal energies computed to the left and right or to the top and bottom of the new search center; and
performing sub-pixel motion search in cross directions around the new search center using linear interpolation method.

11. The search method as in claim 1 is applicable for interlaced motion search, between two fields, a current field and a reference field.

12. The method in claim 11, comprising performing frame-frame motion search conditioned on the results of two field-field motion searches.

13. The search method as in claim 1, wherein the motion search comprises macroblock matching, followed by block level matching, followed by sub-pixel matching.

14. The search method as in claim 1, wherein the user selects the search window based on an expected motion level for a sequence.

15. The search method as in claim 1, wherein the error signal energy is sum of absolute differences (SAD) of the pixel values in the macroblock to be coded and corresponding pixel values in a reference frame.

16. An article comprising a non-transitory storage medium having instructions thereon which when executed by a computing platform result in execution of a method of full pixel motion search for temporal predictive coding in a search window having a search position within a range of the search window, comprising:
performing a configurable number of pattern searches around and starting with the search center, wherein search center of each of the configurable number of pattern searches is progressively updated with a first location with least error signal energy among at least M locations around the search center;
when error signal energy of one of at least M number of locations around the search center is less than that of the search center after the configurable number of pattern searches,
identifying a second location with least error signal energy among the at least M number of locations around the search center; and
computing effective step-size$_X$ and effective step-size$_Y$ as a respective function of distances of the second location from horizontal axis and vertical axis within the range;
performing a 9-point logarithmic step-size search around a center of the search window, wherein 8 search locations are located in each direction around the center of the search window with a step-size, and wherein the step-size is a function of the range;

when error signal energy of one of the 8 search locations is less than that of the center of the search window, identifying a location with least error signal energy among the 8 search locations and setting the identified location as a new center location;

when error signal energy of one of the 8 search locations is greater than or equal to that of the center of the search window, setting the center of the search location as a new center location;

setting a new step-size to half the step-size in each direction around the new center location;

determining whether the new step-size in the horizontal direction is less than or equal to effective step-size$_X$, the new step-size in the vertical direction is less than or equal to effective step-size$_Y$, and error signal energy of the second location is less than that of the new center location;

setting a new search center as the second location when the new step-size in the horizontal direction is less than or equal to effective step-size$_X$, the new step-size in the vertical direction is less than or equal to effective step-size$_Y$, and error signal energy of the second location is less than that of the new center location; and setting the center location as a new search center when otherwise; and repeating performing 9-point logarithmic step-size search around the new search center with the new step size, setting the new center location, setting the new step size, determining, and setting the new search center until the new step size of 1 is reached to identify full pixel motion.

17. The search method of claim 1, wherein the step of performing the 9-point logarithmic step-size search around the center location of the search window is performed when the full pixel motion is not identified in the configurable number of pattern searches.

* * * * *